United States Patent
Lai et al.

(10) Patent No.: US 6,941,398 B2
(45) Date of Patent: Sep. 6, 2005

(54) PROCESSING METHOD, CHIP SET AND CONTROLLER FOR SUPPORTING MESSAGE SIGNALED INTERRUPT

(75) Inventors: Jiin Lai, Taipei (TW); Chau-Chad Tsai, Taipei (JP); Sheng-Chang Peng, Taipei (TW); Min-Hung Chen, Taipei (TW); Meng-Cheng Ku, Taoyuan (TW); Huei-Li Chou, Taipei (TW)

(73) Assignee: Via Technologies, Inc., Taipei Hsien (TW)

( * ) Notice: Subject to any disclaimer, the term of this patent is extended or adjusted under 35 U.S.C. 154(b) by 346 days.

(21) Appl. No.: 09/826,784

(22) Filed: Apr. 4, 2001

(65) Prior Publication Data

US 2001/0032287 A1 Oct. 18, 2001

Related U.S. Application Data

(60) Provisional application No. 60/194,848, filed on Apr. 5, 2000.

(30) Foreign Application Priority Data

Jan. 2, 2001 (TW) .......................................... 90100010 A

(51) Int. Cl.[7] .............................................. G06F 13/14
(52) U.S. Cl. ........................ 710/260; 710/262; 710/268
(58) Field of Search ................................. 710/260–269, 710/48–51, 52–53, 56, 305, 306, 310, 311, 313, 314, 315

(56) References Cited

U.S. PATENT DOCUMENTS 5,835,779 A * 11/1998 Chang et al. ................ 710/261
5,857,090 A * 1/1999 Davis et al. .................. 703/25
5,881,253 A * 3/1999 Seeman ....................... 710/306
6,006,301 A * 12/1999 Tetrick ........................ 710/306
6,021,458 A * 2/2000 Jayakumar et al. ......... 710/266
6,192,442 B1 * 2/2001 Haren et al. ................ 710/269
6,253,275 B1 * 6/2001 Waldron et al. ............ 710/260
6,263,397 B1 * 7/2001 Wu et al. .................... 710/268
6,301,630 B1 * 10/2001 Chen et al. .................. 710/306
6,401,153 B2 * 6/2002 Pawlowski .................. 710/260
6,449,675 B1 * 9/2002 Moyer et al. ............... 710/269
6,799,316 B1 * 9/2004 Aguilar et al. ................ 718/1

OTHER PUBLICATIONS

PCI Local Bus Specification 2.2, Dec. 18, 1998, Section 6.8.*

* cited by examiner

Primary Examiner—Paul R. Myers
Assistant Examiner—Raymond N Phan
(74) Attorney, Agent, or Firm—J.C. Patents

(57) ABSTRACT

A processing method, a chip set and a controller for supporting message signaled interrupt. A memory write transaction on a PCI bus is monitored. When the address of the system memory specified in the interrupt message of the write transaction is located at a range of a reserved interrupt address, the interrupting service sequence is performed. The reserved interrupt address is located in an address of a system memory. Thus, the data to be processed and the system-specified message are written in the buffer and arranged in sequence. The problem of "write buffer latency" is resolved, and is irrelevant to the level of the PCI bus. Many system specified messages can be stored in the system memory, so that multiple system message signaled interrupts issue from different peripheral components can be processed in the same interrupt service routine.

24 Claims, 5 Drawing Sheets

PROCESSING METHOD, CHIP SET AND CONTROLLER FOR SUPPORTING MESSAGE SIGNALED INTERRUPT

CROSS-REFERENCE TO RELATED APPLICATION

This application claims the priority benefit of U.S.A. provisional application Ser. No. 60/194,848, filed Apr. 5, 2000, and Taiwan application Serial No. 90100010, filed Jan. 2, 2001.

BACKGROUND OF THE INVENTION

1. Field of the Invention

The invention relates in general to a compatible interface and a controlling method of a peripheral component interconnection (PCI) bus. More particular, the invention relates to an interrupt processing method and a compatible hardware of a PCI bus.

2. Description of the Related Art

Currently, the PCI bus is used as the main bus for connecting a peripheral interface in a computer motherboard. Only the master or the main bridge in the PCI bus can initiate data transaction. The PCI compatible component to initiate a read or write transaction is called an initiator. The corresponding transaction object is called the target. The data transaction between the PCI compatible components is controlled by the interface controlling signals such as a cycle frame (FRAME) signal, an address/data bus (AD) signal, a command/byte enable (CBE[3:0]) signal, an initiator ready (IRDY) signal, a target ready (TRDY) signal and a stop (STOP) signal.

The FRAME is output from the initiator to indicate the start and lasting period of access. When the FRAME is output, the data transaction via the PCI bus starts. When the FRAME is maintained at a low potential, that data transaction continues. Meanwhile, a valid address is output from the address/data bus (AD) signal during the address cycle. A valid bus command (that meets the PCI specification) is output from the CBE[3:0] to instruct the target what the data transaction type is required by the initiator. The CBE[3:0] line comprises 16 different bus commands encoded with four bits, this is specifically defined in PCI specification. After the valid address, the data is output from the address/data bus, and the cycle is called the data cycle. At the same time, the CBE[3:0] line outputs the byte enable signals of the transmitting data. The IRDY signal and the TRDY signal are used to respectively instruct that the initiator and the target are ready to perform data transmission. For example, during the read operation, the IRDY signal instructs that the initiator is ready to receive data, and the write operation, the TRDY signal instructs that the target is ready to receive data. Regarding STOP signal, the target is used to request the initiator to stop the current data transaction. When the output of the FRAME signal is stopped, it means that the transaction status is to transmit the last data or the last data has been transmitted.

Apart from the above interface control signals during data transaction, the PCI bus further defines four interrupt signals: INTA, INTB, INTC and INTD. When any of the peripheral components of the PCI bus requires the driving program to process, these interrupt signals can be used to catch the attention. However, as the PCI bus has more than one peripheral component, the interrupt signals are thus the limited resources. It is thus inevitable to share the interrupt signals. When an interrupt occurs, the interrupt service routine has to inspect the status of the peripheral components to determine which peripheral component causes the interrupt as a reference to assign the control to the exact peripheral component driving program. A great burden is thus caused to the software.

FIG. 1 shows a structure of a PCI bus compatible system used in a personal computer motherboard. The conventional personal computer motherboard comprises a control chip set 100, a dynamic random access memory 110, a central processing unit (CPU) 120, a PCI bus I 130, and peripheral components 150. The control chip set 100 comprises a south bridge chip 102 and a north bridge chip 104. Many of the conventional high level motherboards further comprise a PCI—PCI bridge 140, a PCI bus II 160 and peripheral components 170 located in the second level.

When any of the peripheral components 150 requires an interrupt service routine to process, a memory write transaction is started, and the data to be processed is written into the dynamic random access memory 110 via the control chip set 100. Meanwhile, one of the four interrupt signals of the PCI bus is output by the peripheral components 150 to cause the attention of the system. The control chip set 100 has to output an exact interrupt signal INTR to the central processing unit 120, so that the central processing unit 120 can process the data to be processed. It is well known that, based on the consideration of performance, a PCI bus is a multiplex system that allows many masters to control. When the control chip set 100 starts the memory write transaction, it does not indicate that the data to be processed has been written to the dynamic random access memory completely. The data to be processed can be stored in the buffer of the control chip set 100 without being written into the dynamic random access memory 110. The buffer in the control chip set 100 may store multiple bits of data output from different peripheral components. If the data to be processed, which is not completely written into the dynamic random access memory 110, is processed by the central processing unit 120 writing the data to be processed into the dynamic random access memory 110, an error may be caused. This is a situation, which is not allowed to happen.

One conventional method to resolve the above problem is to control the timing of the interrupt signal INTR, which is generated by the control chipset 100, to the central processing unit 120. Before the data to be processed is completely written, the generation of the interrupt signal INTR is prohibited. Since the buffer may store multiple bits of data belong to different peripheral components, and the control chip set 100 cannot determine which data is the data to be processed, the interrupt signal INTR is not allowed to generate. It is thus cause a delay for the generation of the interrupt signal INTR to affect the performance. It is well known that when the buffer is deeper, the write-buffer latency is longer. Especially in the current control chip set 100, the write-buffer latency is more significant since the south bridge chip 102 is responsible for controlling the PCI bus 130, and the north bridge chip 104 is responsible for controlling the dynamic random access memory 110. When the peripheral components 170 require an interrupt process via the multiple level PCI bus structure, it is even more difficult to estimate the write-buffer latency.

Another conventional method is to control the timing for the central processing unit 120 to process the data to be processed. The central processing unit 120 has to inspect the status of the peripheral components as a reference for interrupt process. According to the ordering rules of PCI (read cannot pass posted write data), by this method, the central processing unit 120 has to wait until the data to be processed to be written completely and inspects the status of the peripheral components. However, in this method, in addition to the problem of the above write-buffer latency, the performance of the system is seriously affected since the read cycle of a general central processing unit does not have the function of pipeline.

In the specification of PCI bus 2.2, an optional interrupt method called message signaled interrupt (MSI) is provided. By writing a system specified message from the peripheral component to the system specified address, that is, to write the system specified message to the system specified address of the PCI bus as the system specified address of the memory write transaction. The system specified message and address are initialized during the device configuration of the PCI bus. However, the current system to support the message signaled interrupt uses the same address for the system specified address to reduce the flexibility of processing multiple system specified messages of the peripheral components in the same interrupt service routine. The remaining flexibility is to use the 16-bit system specified message to represent 16 various possible reasons that cause the message signaled interrupt. In the current system, the problem of write-buffer latency has not been resolved, so that other conditions may occur, for example, the new message of the system specified message may overwrite the old system specified message due to long write-buffer latency.

SUMMARY OF THE INVENTION

The invention provides a processing method, a chip set and a controller to support message signaled interrupt without being limited to the number of the interrupt pins. The control chip set can exactly output an interrupt signal to the central processing unit right after the data to be processed is completely written to the system memory. The problem of write-buffer latency is thus resolved. The invention is suitable to apply to a multiple level PCI bus. In addition, in the same interrupt service routine, multiple interrupt requests of different peripheral components can be processed, and the system-specified message may include flexibility of interrupt occurrence.

The processing method to support the message signaled interrupt is applicable to a control chip set of a motherboard. The chip set is coupled to a PCI bus and a system memory. The method comprises following steps. A memory write transaction of the PCI bus is monitored. When the address of the memory write transaction is located in the reserved interrupt address, the interrupt process is executed. The reserved interrupt address is located in the address of the system memory. The control chip set is further coupled to a central processing unit. The interrupt process includes writing the system-specified message of the interrupt message into the system memory according to the memory write transaction. After writing the system-specified message to the system memory, interrupt counting value is increased. An interrupt request signal is generated to the central processing unit according to the interrupt counting value. The interrupt service routine is activated by the central processing unit.

In one embodiment of the invention, the interrupt process further comprises the following steps. The interrupt counting value is read and stored as a sent interrupt counting value. According to the sent interrupt counting value, the reserved interrupt address of the system memory is scanned. All the system-specified messages within the range of the reserved interrupt address are processed. The number of the processed system specified messages is calculated as the read interrupt counting value. The interrupt counting value is subtracted with the read interrupted counting value and restored in the interrupt counting value. The step of writing the system specified messages into the system memory according to the address and data of the memory write transaction includes the following steps. An actual memory address is generated according to the address and data of the memory write transaction. The data of the memory write transaction is then written into the actual memory address of the system memory.

The message signaled interrupt controller provided by the invention can be applied to a computer system. The computer system comprises at least a control chip set, a PCI bus and a system memory. The controller chip set is coupled to the PCI bus and the system memory. The control chip set further comprises a dynamic random access memory controller, a CPU interface and an interrupt controller. The message signaled interrupt controller comprises a message signaled interrupt detector, a message signaled interrupt calculator, and a message signaled interrupt generator. The message signaled interrupt detector is coupled to the PCI bus and the dynamic random access memory controller to monitor the memory write transaction of the PCI bus. When the address of the memory write transaction falls at a reserved interrupt address, the system specified message is written into the system memory via the dynamic random access memory controller, and then a message signaled interrupt acknowledging signal is output. The message signaled interrupt calculator is coupled to the message signaled interrupt detector and the CPU interface to receive and count the message signaled interrupt acknowledging signal, and to form the interrupt counting value according to the read interrupt counting value output by the CPU. The message signaled interrupt generator is coupled to the message signaled interrupt calculator and the interrupt controller. According to the interrupt counting value, a message signaled interrupt request signal is generated to the interrupt controller, so that the interrupt controller generates the interrupt request signal. It is very important that, in the invention, the reserved interrupt address is located within address of the system memory.

In one embodiment of the message signaled interrupt controller, the control chip set is coupled to the central processing unit, and the message signaled interrupt generator is in the control chipset. After the central processing unit processes the system specified message, the central processing unit outputs the interrupt service termination signal to the message signaled interrupt generator via the CPU interface. The central processing unit outputs the read interrupt counting value to the message signaled interrupt calculator via the CPU interface. The above central process unit can obtain the sent interrupt counting value via the CPU interface in advance. The above message signaled interrupt detector generates an actual memory address according to the interrupt message of the memory write transaction, and then write the system specified message of memory write transaction into the actual memory address of the system memory.

The invention further provides a chip set for supporting message signaled interrupt. The chip set is coupled to the PCI bus, the central processing unit and the system memory. The chip set includes a dynamic random access memory controller, a CPU interface, an interrupt controller and a message signaled interrupt controller. The dynamic random access memory controller is coupled to the system memory to control and access the system memory. The CPU interface is coupled to the central processing unit as a control interface between the chip set and the central processing unit. The interrupt controller is coupled to the central processing unit to generate the interrupt request signal to the central processing unit, so as to enable the central processing unit to initiate the interrupt service routine (ISR). The message signaled interrupt controller is coupled to the PCI bus, the dynamic random access memory controller, the CPU interface and the interrupt controller to monitor the memory write transaction of the PCI bus. When the address of the memory write transaction is located in the reserved interrupt address, the system specified message is written into the system memory via the dynamic random access memory controller, and then the message signaled interrupt request signal is output. Consequently, the interrupt controller generates the interrupt request signal. A very important point is that the reserved interrupt address is located within the address of the system memory in the invention.

In the invention, as the memory write transaction for generating the message signaled interrupt has an address located in the address of the system memory, that is, the system specified message can really written into the system memory, the system memory can be used to store multiple system specified message s. As a result, in the same interrupt service routine, multiple system specified messages of different peripheral components can be processed. In addition, the message data can include the flexibility of reasons for interrupt occurrence. To the chip set, as the data to be processed and the interrupt message for interrupt process are arranged in sequence in the write buffer, it consequently resolves the problem of write-buffer latency and is irrelevant to the PCI bus level.

Both the foregoing general description and the following detailed description are exemplary and explanatory only and are not restrictive of the invention, as claimed.

DESCRIPTION OF THE PREFERRED EMBODIMENTS

Figure 1:
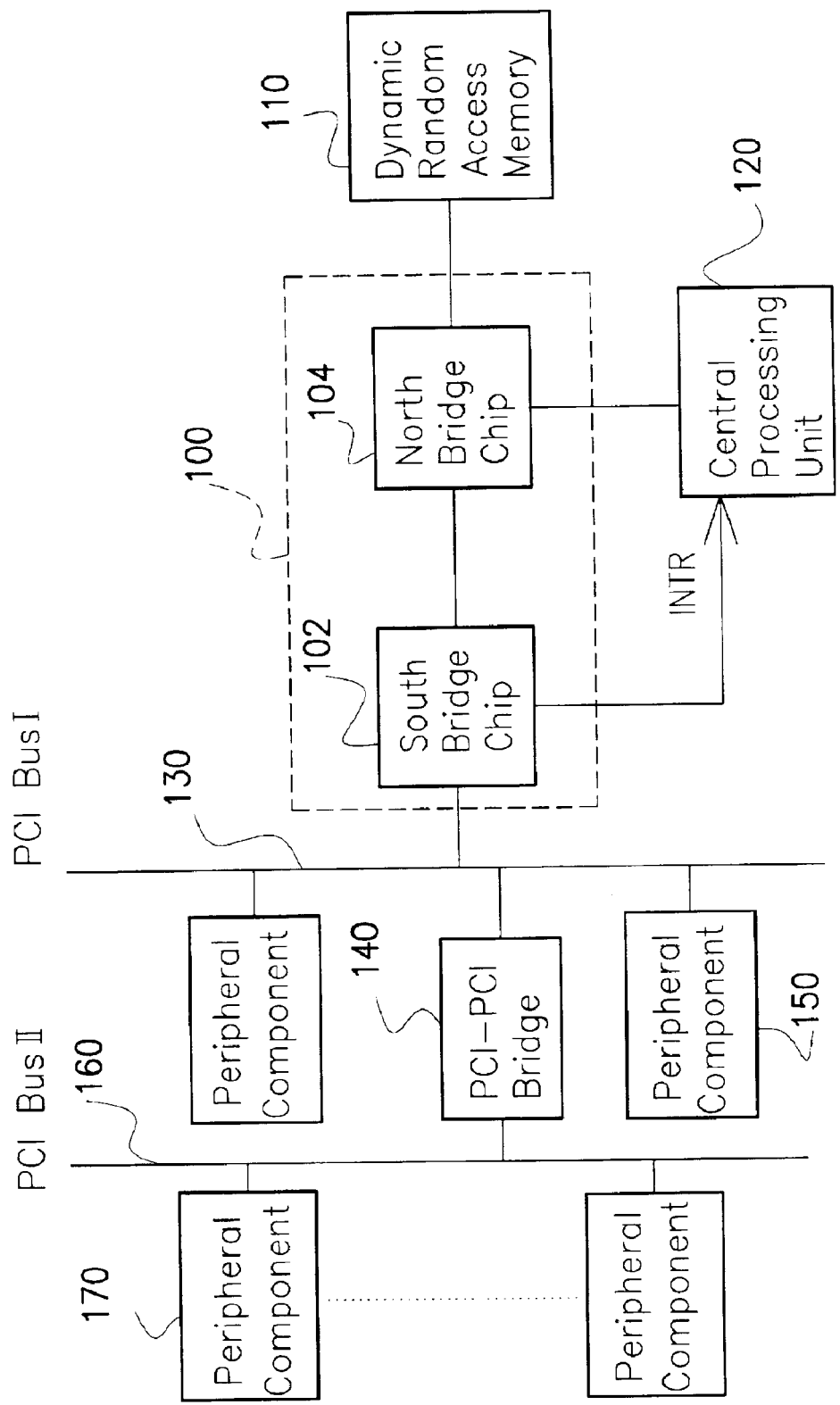
FIG. 1 shows a structure of a conventional PCI bus system used in a motherboard of a personal computer.
Figure 2:
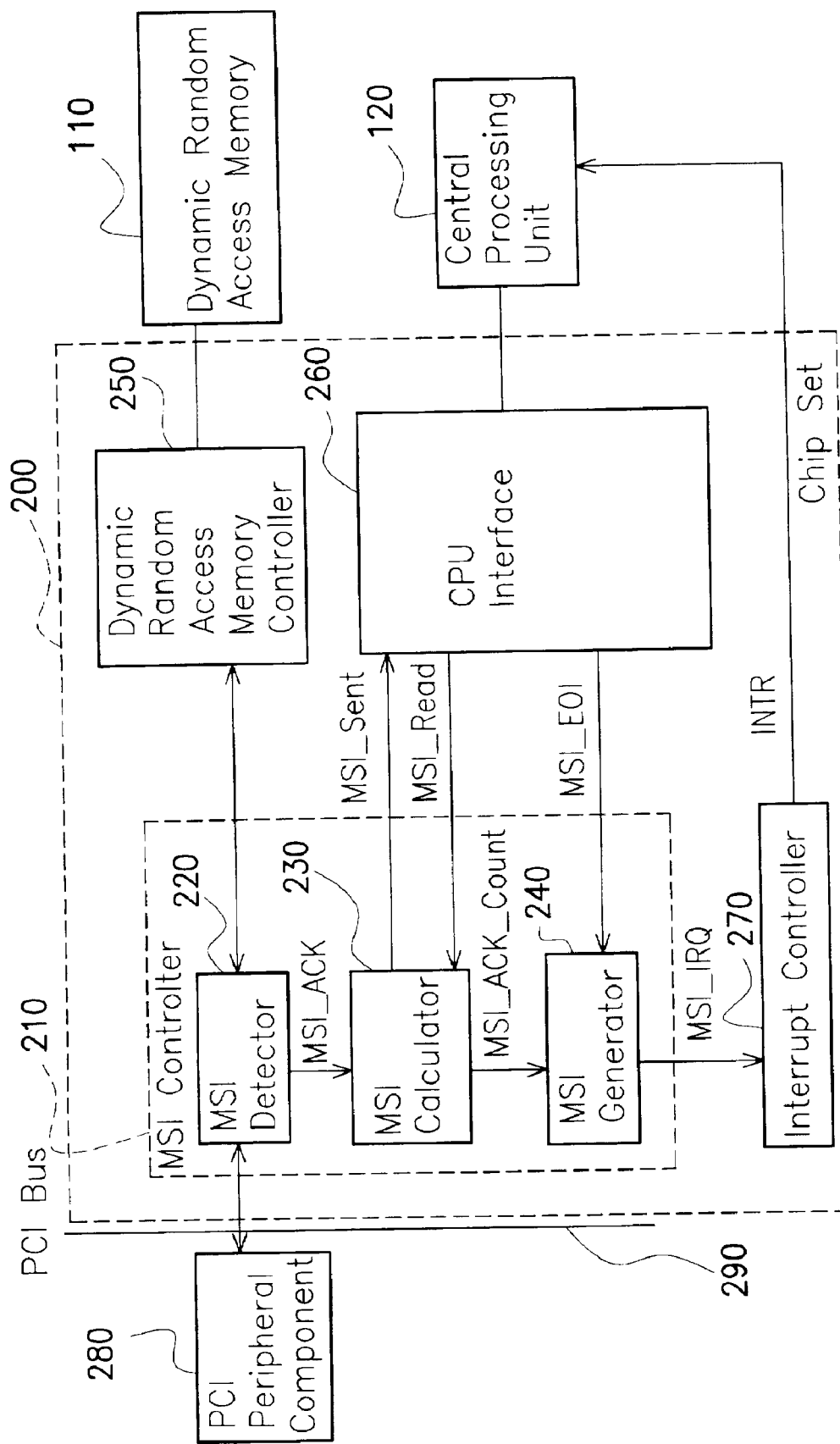
FIG. 2 is a block diagram showing a control chip set and controllers of the control chip set for supporting message signaled interrupt according to the invention.

FIG. 2 is a block diagram showing a control chip set and controllers of the control chip set provided by the invention. In FIG. 2, the control chip set 200 are coupled to at least the PCI bus 290, the central processing unit 120 and the system memory (typically, a dynamic random access memory 110). In the invention, the control chip set 200 comprises at least a message signaled interrupt controller (MSI controller) 210, a dynamic random access memory controller (DRAMC) 250, a CPU interface 260 and an interrupt controller 270.

The dynamic random access memory controller 250 is coupled to the system memory 110 to control and access the system memory 110. The CPU interface 260 is coupled to the central processing unit 120 as a control interface between the control chip set 200 and the central processing unit 120. The interrupt controller 270 is coupled to the central processing unit 120 to generate the interrupt request signal (INTR) to the central processing unit, so as to enable the central processing unit 120 to initiate the interrupt service routine.

The MSI controller 210 provided by the invention includes a message signaled interrupt detector (MSI detector) 220, a message signaled interrupt calculator (MSI calculator) 230, and a message signaled interrupt generator (MSI generator) 240. The MSI detector 220 is coupled to the PCI bus 290 and the dynamic random access memory controller 250. The CPU interface 260 is coupled to the MSI calculator 230 and the MSI generator 240. The MSI generator 240 is also coupled to the interrupt controller 270. In the invention, the MSI controller 210 monitors the memory write transaction of the PCI bus 290. When any of the PCI peripheral components 280 causes attention of the system by message signaled interrupt, an interrupt message is output. This interrupt message includes a system-specified address and a system specified message. The address represented by the interrupt message falls into the reserved interrupt address predetermined by the system. Meanwhile, the MSI controller 210 monitors the situation and write the system-specified message into the system memory via the dynamic random access memory controller 250. The MSI controller 210 then outputs a message signaled interrupt request signal (MSI_IRQ) to enable the interrupt controller 270 to generate the interrupt request signal (INTR).

A very important feature of the invention is that the reserved interrupt address is located within the address of the system memory. In one embodiment of the invention, different system specified address is distributed to each of the MSI controller of the peripheral components in advance. Therefore, the MSI controller 210 writes the system-specified message into the corresponding address of the system memory. Before the PCI peripheral component 280 outputs the memory write transaction of message signaled interrupt, the data to be processed is written into the system memory using the memory write transaction. Thus, to the control chip set 200, the data to be processed and the system-specified message are written and arranged in sequence in the write buffer. As a result, the MSI controller 210 firstly writes the data to be processed to the system memory, and then writes the system specified message to the system memory right away. After writing the system specified message into the system memory, the message signaled interrupt request signal (MSI_IRQ) is output immediately. Therefore, the problem caused by write-buffer latency is resolved. This method uses the basic memory write transaction to resolve the problem without being related to the PCI bus level.

The MSI controller 210 is installed in the control chip set 200 of the motherboard to save the package cost. However, it is not necessary to install the control set 200 in practical application. The MSI detector 220 of the MSI controller 210 is coupled to the PCI bus 290 and the dynamic random access memory controller 250 to monitor the memory write transaction of the PCI bus 290. When the system specified address of the interrupt message is located in the range of the reserved interrupt address, the MSI detector 220 generates an actual memory address (Memory_address) according to the interrupt message of the memory write transaction. In this embodiment, the seventh to the thirty-first bits of system specified address of the memory write transaction are assembled with the zeroth to the fourth bits of system specified message of the memory transaction and added two digits "0" in the lowest bit. It is represented as:

Memory_address={MSI_address[31:7], MSI_data[4:0],00}

The MSI detector 220 writes the system specified message of the memory write transaction to the actual memory address (Memory_address) of the dynamic random access memory 110 via the dynamic random access memory controller 250. That is, the data to be processed and the system-specified message are written into the system memory via the dynamic random access memory controller 250. The MSI detector 220 then outputs the message signaled interrupt acknowledging (MSI_ACK) signal to notice the MSI calculator 230 that the data to be processed and the system specified message have been exactly written into the system memory.

The MSI calculator 230 of the MSI controller 210 is coupled to the MSI detector 220 and the CPU interface 260 to receive the above message signaled interrupt acknowledging signal (MSI_ACK). The counting value of MSI_ACK called as the interrupt counting value (MSI_ACK_count) is output to the MSI generator 240. The MSI generator 240 is coupled to the MSI calculator 230 and the interrupt controller 270 to receive the above interrupt counting value (MSI_ACK_count). According to the interrupt counting value (MSI_ACK_count), the message signaled interrupt request signal (MSI_IRQ) is generated to further enable the interrupt controller 270 to generate the interrupt request signal (INTR). In the embodiment, when the MSI_ACK_count is larger than 0, the MSI generator 240 generates the message signaled interrupt request signal (MSI_IRQ). After the interrupt controller 270 receives the message signaled interrupt request signal (MSI_IRQ), an actual hardware interrupt request signal (INTR) is output to the central processing unit 120 to initiate the interrupt service routine. It is thus known to people of ordinary skill in the art that the MSI generator 240 and the central processing unit 120 are communicated with each other via the CPU interface 260, or a directly connection.

At the beginning of an interrupt service sequence, the central processing unit 120 obtains the number of interrupt messages MSI_sent that have been written into the system memory via the CPU interface 260. That is, the number of the message signaled interrupts written into the dynamic random access memory is obtained by the central processing unit 120. The MSI calculator 230 sets the MSI_sent as the current interrupt counting value (MSI_ACK_count). According to the MSI_sent, the central processing unit 120 scans the reserved system specified address of the system memory to look for the possible system specified message, and to process all the system-specified messages in the reserved interrupt address. The number of the system-specified messages that have been processed is calculated and called the read interrupt counting value (MSI_read). It is to be noted that the system-specified messages that have been processed in the system memory have to be erased to avoid the system specified message to be processed once again. While erasing such memory, a mode of locked read-modified-write has to be operated to avoid the problem caused by writing new system specified message at the same time. Before the termination of the interrupt service sequence, if MSI_read is smaller than MSI_sent, MSI_read is modified as MSI_sent, the central processing unit 120 outputs an interrupt service termination signal (MSI_EOI) to the MSI generator 240 via the CPU interface 260. The central processing unit 120 outputs also the read interrupt counting value MSI_read to the MSI counter 230 via the motherboard interface 260. The MSI counter 230 subtracts the latest interrupt counting value (MSI_ACK_count) with the read interrupt counting value (MSI_read) and stores to the interrupt counting value (MSI_ACK_count). Meanwhile, if the interrupt counting value is still larger than 0, the MSI generator 240 generates a message signaled interrupt request signal (MSI_IRQ) again.

The system is basically a multiplex operation system with each unit emitting an individual request, for example, different PCI bus peripheral components 280 may emit message signal interrupts simultaneously, continuously or randomly. Therefore, when the central processing unit 120 stars an interrupt service routine, there may have been many system specified messages stored in the system memory, and the system specified message s stored in the system memory during the execution of the interrupt service routine may be increased continuously. Using the above structure, many system-specified messages can be stored in the system memory. Therefore, in the same interrupt service routine, different system specified messages of different peripheral components are processed simultaneously. In addition, the system specified message may include the flexibility of reasons for interrupt occurrence.

Figure 3A:
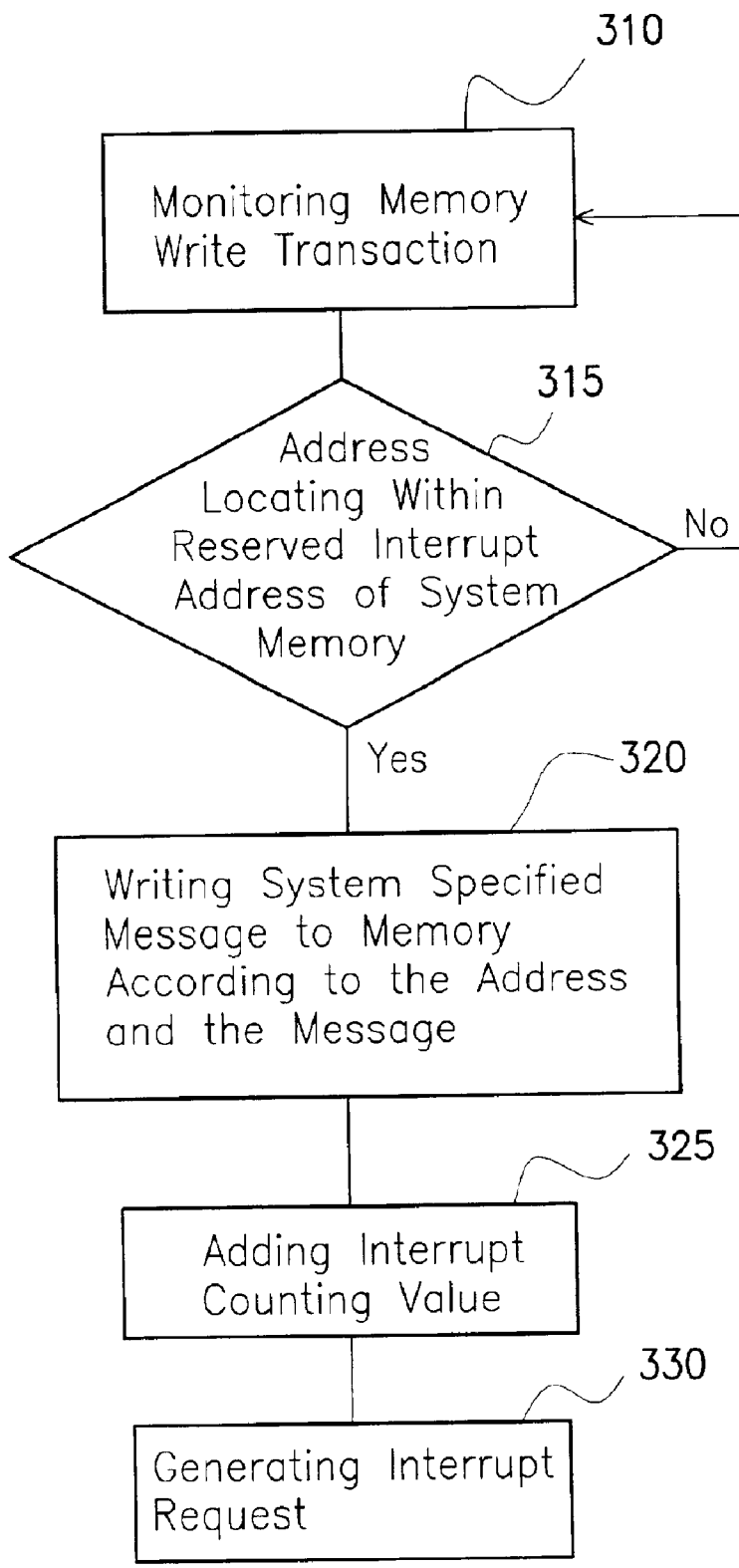
FIGS. 3A, 3B and 3C are flow charts showing a processing method for supporting the message signaled interrupt according to the invention.
Figure 3B:
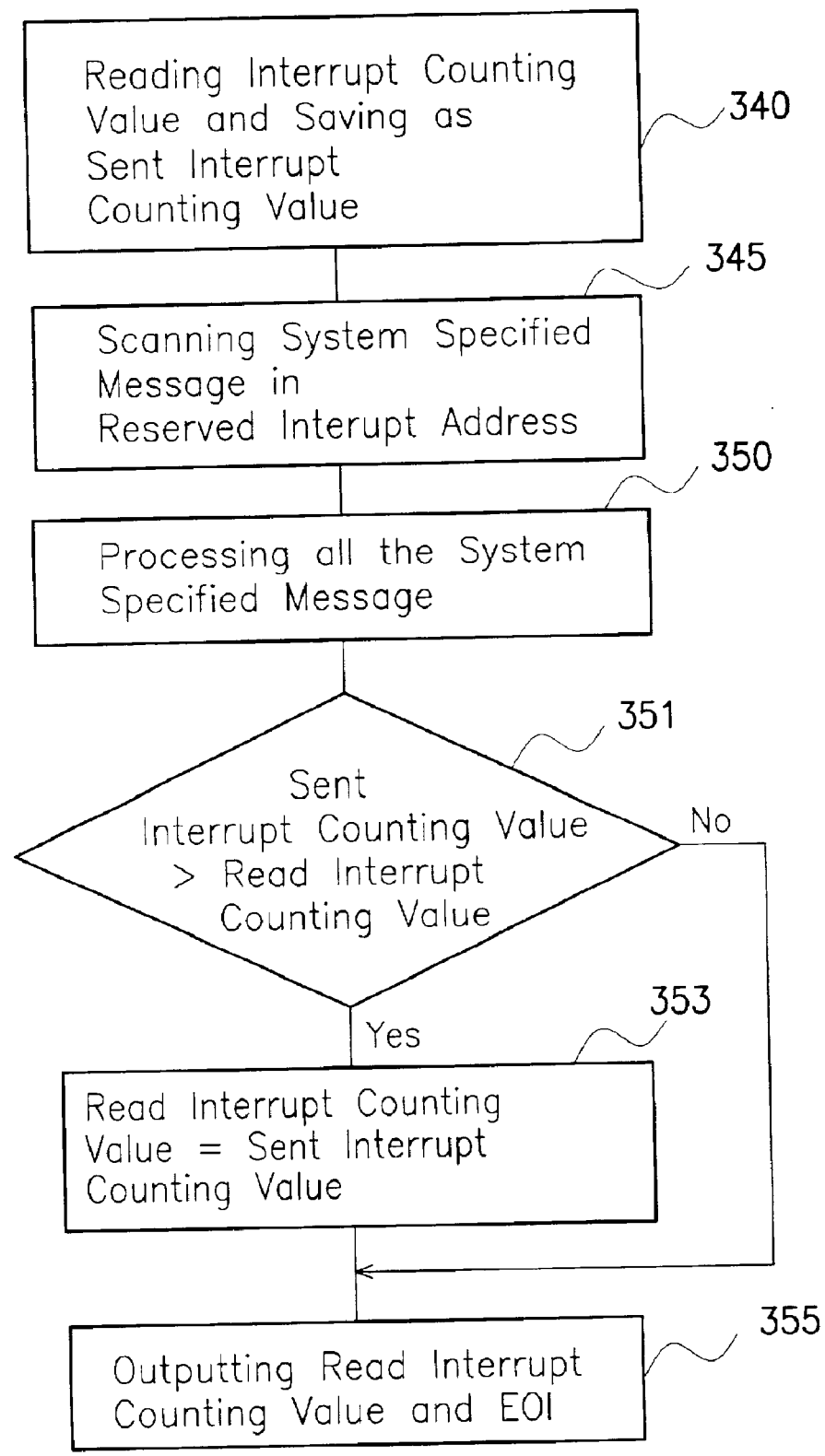
Figure 3C:
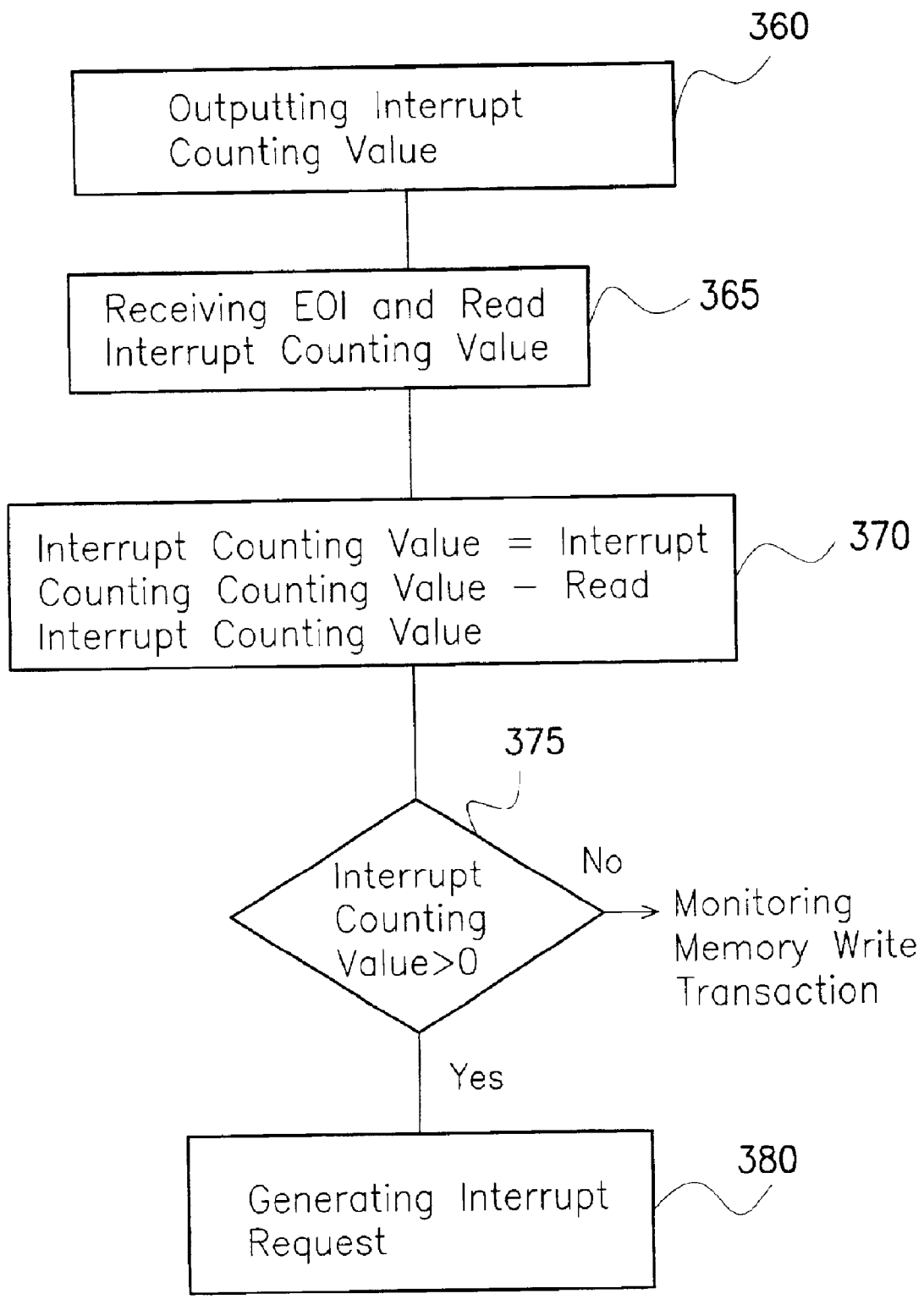

According to the above, a processing method for supporting a message signaled interrupt is provided. FIGS. 3A, 3B and 3C illustrate the flow charts of such processing method. The processing method provided by the invention can be applied to a control chip set of a motherboard. The chip set is coupled to a PCI bus, a system memory and a central processing unit. The step 310 as shown in FIG. 3A is performed. The memory write transaction of the PCI bus is monitored. According to the specification of the message signaled interrupt, the interrupt message of the memory write transaction is a system specified address and a system specified message. In step 315, when the actual memory address specified in the interrupt message falls within the reserved interrupt address, the interrupt process is performed (below step 320). The above interrupt process service includes the following steps. The step 320 is performed to write the interrupt message into the system memory, that is, to generate an actual memory address according to the interrupt message of the memory write transaction. The system-specified message of the memory write transaction is then written into actual memory address of the system memory. The step 325 is performed. When the system-specified message is successfully written into the system memory, the interrupt counting value is increased. The step 330 is performed. According to the interrupt counting value, a hardware interrupt request is generated to the central processing unit. The interrupt service routine is then processed by the central processing unit.

In FIG. 3B, one embodiment of the processing method for supporting the message signaled interrupt processing method is illustrated. During the interrupt service routine, the process of the central processing unit includes the following steps. The step 340 is performed to read the interrupt counting value and save it as the sent interrupt counting value. The step 345 is performed to scan all the system specified message s in the reserved interrupt address of the system memory according to the interrupt counting value. The step 350 is performed to process all the system specified messages in the reserved interrupt address, and the number of the system specified messages that have been processed is calculated as the read interrupt counting value. In step 351, whether the sent interrupt counting value is larger than the read interrupt counting value is determined. In step 353, if the counting value is larger, the read interrupt counting value is modified as the sent interrupt counting value. In step 355, the read interrupt counting value and the interrupt service termination signal are output to notice the MSI controller to deduct the read interrupt counting value from the interrupt counting value and then save it to the interrupt counting value.

In FIG. 3C, the subsequent process of the MSI controller is illustrated. In step 360, the interrupt counting value is output. In step 365, the read interrupt counting value and the interrupt service termination signal from the central processing unit are received. The step 370 is performed to subtract the latest interrupt counting value with the read interrupt counting value, and then save the result to the interrupt counting value. Meanwhile, if the interrupt counting value is still larger than 0 (step 375), the step 380 is executed. The message signaled interrupt request signal is generated again. Otherwise, the process goes back to the beginning to continuously monitoring the memory write transaction of the PCI bus.

It is thus known that the above steps 351 and 353 that achieve the modification of the read interrupt counting value can be omitted. Instead, in the step 370, by subtracting the interrupt counting value with the larger one of MSI_read and MSI_sent can also achieve the same objective.

Other embodiments of the invention will appear to those skilled in the art from consideration of the specification and practice of the invention disclosed herein. It is intended that the specification and examples to be considered as exemplary only, with a true scope and spirit of the invention being indicated by the following claims.

What is claimed is:

1. A processing method of supporting message signaled interrupt, applied to a chip set which is coupled to a PCI bus and a system memory, the processing method comprising at least:

monitoring a memory write transaction of the PCI bus; and performing an interrupt sequence when an address of the memory write transaction falls into a reserved interrupt address; wherein the reserved interrupt address is located in an address of the system memory, wherein the chip set is coupled to a central processing unit, and the interrupt sequence includes the following steps:

writing a system specified message of an interrupt message to the system memory according to the interrupt message of the memory write transaction;

adding an interrupt counting value after the system specified message is written into the system memory, generating an interrupt request to the central processing unit according to the interrupt counting value; and activating an interrupt service routine by the central processing unit.

2. The processing method according to claim 1, wherein the interrupt sequence further comprises:

reading the interrupt counting value and saving the intermit counting value as a sent internipt counting value;

scanning the reserved interrupt address of the system memory according to the sent interrupt counting value;

processing all the system specified messages in the reserved interrupt address, and calculating the number of the processed system specified messages as the read interrupt counting value; and equalizing the interrupt counting value to the interrupt counting value subtracted with the read interrupt counting value.

3. The processing method according to claim 1, wherein the interrupt sequence further comprises:

reading the interrupt counting value and saving the interrupt counting value as a sent interrupt counting value;

scanning the reserved interrupt address according to the sent interrupt counting value;

processing all the system specified messages in the reserved interrupt address and calculating the number of the system specified message that have been processed as the read interrupt counting value; and equalizing the interrupt counting value to the interrupt counting value subtracted with a larger one between the read interrupt counting value and the sent interrupt counting value.

4. The processing method according to claim 1, wherein the step of writing the system specified message of the interrupt message into the system memory according to the interrupt message of the memory write transaction includes the following steps:

generating an actual memory address according to the interrupt message of the memory write transaction; and writing the system specified message into the actual memory address of the system memory.

5. The processing method according to claim 1, wherein the interrupt message of the memory write transaction includes a system specified address and the system specified message.

6. The processing method according to claim 2, wherein the step of calculating the interrupt counting value comprises:

equalizing the read interrupt counting value to the sent interrupt counting value when the read interrupt counting value is smaller than the sent counting value.

7. A message signaled interrupt controller, applied to a system that comprises a chip set, a PCI bus and a system memory, wherein the chip set is coupled to the PCI bus and the system memory and includes a dynamic random access memory controller, a CPU interface and an interrupt controller, the message signaled interrupt controller comprising:

a message signaled interrupt detector, coupled to the PCI bus and the dynamic random access memory controller to monitor a memory write transaction of the PCI bus, and when an address of the memory write transaction falls within a reserved interrupt address, a system specified message is written to the system memory via the dynamic random access memory controller and a message signaled interrupt acknowledging signal is output;

a message signaled interrupt calculator, coupled to the message signaled interrupt detector and the CPU interface to receive and count the message signaled interrupt acknowledging signal and to form an interrupt counting value, converting the interrupt counting value into a sent interrupt counting value, and outputting the sent interrupt counting value; and a message signaled interrupt generator, coupled to the message signaled interrupt calculator and the interrupt controller, to generate a message signaled interrupt request signal to the interrupt controller, so as to enable the interrupt controller to generate an interrupt request signal; wherein the reserved interrupt address is located in the system memory.

8. The message signaled interrupt controller according to claim 7, wherein the chip set is further coupled to a central processing unit, and the message signaled interrupt generator is coupled to the CPU interface, after processing the system specified message, the central processing unit outputs an interrupt service termination signal to the message signaled interrupt generator and a read interrupt counting value to the message signaled interrupt calculator via the CPU interface.

9. The message signaled interrupt controller according to claim 7, wherein the chip set is coupled to a central processing unit to obtain the sent interrupt counting value via the motherboard interface.

10. The message signaled interrupt controller according to claim 7, wherein the message signaled interrupt detector generates an actual memory address according to an interrupt message of the memory write transaction, and write the system specified message of the memory write transaction into the actual memory address of the system memory via the dynamic random access memory controller.

11. The message signaled interrupt controller according to claim 7, wherein the interrupt message memory of the write transaction includes a system specified address and the system specified message.

12. A chip set of supporting message signaled interrupt, the chip set being coupled to a PCI bus, a central processing unit and a system memory, and the chip set comprising:
   a dynamic random access memory controller, coupled to the system memory to control and access the system memory;
   a CPU interface, coupled to the central processing unit as a control interface between the chip set and the central processing unit;
   an interrupt controller, coupled to the CPU interface to generate an interrupt request signal to the central processing unit, and to enable the central processing unit to initiate an interrupt service routine; and
   a message signaled interrupt controller, coupled to the PCI bus, the dynamic random access memory controller, the CPU interface and the interrupt controller to monitor a memory write transaction of the PCI bus, when an address of the memory write transaction falls into a reserved interrupt address, a system specified message is written into the system memory via the dynamic random access memory controller, and a message signaled interrupt request signal is output to enable the interrupt controller to generate the interrupt request signal; wherein the reserved interrupt address is located in an address of the system memory,
   wherein the message signaled interrupt controller comprises:
   a message signaled interrupt detector, coupled to the PCI bus and the dynamic random access memory controller to monitor the memory write transaction, and when the address specified in the interrupt message of the memory write transaction falls into the reserved interrupt address, the system specified message is written into the system memory via the dynamic random access memory controller and a message signaled interrupt acknowledging signal is output;
   a message signaled interrupt calculator, coupled to the message signaled interrupt detector and the CPU interface to receive and count the message signaled interrupt acknowledging signal to form an interrupt counting value, and to convert the interrupt counting value into a sent interrupt counting value, and to output the sent interrupt counting value according to the motherboard interface; and
   a message signaled interrupt generator, coupled to the message signaled interrupt calculator and the interrupt controller, to generate the message signaled interrupt request signal to the interrupt controller according to the interrupt counting value, and to enable the interrupt controller to generate the interrupt request signal.

13. The chip set according to claim 12, wherein the message signaled interrupt generator is further coupled to the CPU interface, and after processing the system specified message, the central processing unit outputting an interrupt service termination signal to the message signaled interrupt generator and a read interrupt counting value to the message signal interrupt counter via the CPU interface.

14. The chip set according to claim 12, wherein the central processing unit obtains the sent interrupt counting value via the CPU interface.

15. The chip set according to claim 12, wherein the message signaled interrupt detector generates an actual memory address according to the interrupt message of the memory write transaction, and writes the system specified message of the memory write transaction into the actual memory address of the system memory.

16. The chip set according to claim 12, wherein the central processing unit reads sent interrupt counting value, scans the reserved interrupt address of the system memory according to the sent interrupt counting value, processes the number of all the system specified message in the reserved interrupt address as a read interrupt counting value, and outputs the read interrupt counting value.

17. The chip set according to claim 16, wherein the central processing unit determines that the read interrupt counting value is smaller than the sent interrupt counting value, the read interrupt counting value is equal to the sent interrupt counting value.

18. The chip set according to claim 16, wherein message signaled interrupted calculator makes the interrupt counting value equal to the interrupt counting value subtracted with a larger one between the read interrupt counting value and the sent interrupt counting value.

19. A processing method of supporting message signaled interrupt, applied to a chip set which is coupled to a PCI bus and a system memory, the processing method comprising:
   monitoring a memory write transaction whose address falls into a reserved interrupt address located in the system memory; and
   performing an interrupt sequence when the monitored memory write transaction is sent on the PCI bus,
   wherein the chip set is coupled to a central processing unit, and the interrupt sequence includes the following steps:
   writing a system specified message of an interrupt message to the system memory according to the interrupt message of the memory write transaction;
   adding an interrupt counting value after the system specified message is written into the system memory;
   generating an interrupt request to the central processing unit according to the interrupt counting value; and
   activating an interrupt service routine by the central processing unit.

20. The processing method according to claim 19, wherein the interrupt sequence further comprises:
   reading the interrupt counting value and saving the interrupt counting value as a sent interrupt counting value;
   scanning the reserved interrupt address of the system memory according to the sent interrupt counting value;
   processing all the system specified messages in the reserved interrupt address, and calculating the number of the processed system specified messages as the read interrupt counting value; and
   equalizing the interrupt counting value to the interrupt counting value subtracted with the read interrupt counting value.

21. The processing method according to claim 19, wherein the interrupt sequence further comprises:

reading the interrupt counting value and saving the interrupt counting value as a sent interrupt counting value;

scanning the reserved interrupt address according to the sent interrupt counting value;

processing all the system specified messages in the reserved interrupt address and calculating the number of the system specified message that have been processed as the read interrupt counting value; and equalizing the interrupt counting value to the interrupt counting value subtracted with a larger one between the read interrupt counting value and the sent interrupt counting value.

22. The processing method according to claim 19, wherein the step of writing the system specified message of the interrupt message into the system memory according to the interrupt message of the memory write transaction includes the following steps:

generating an actual memory address according to the interrupt message of the memory write transaction; and writing the system specified message into the actual memory address of the system memory.

23. The processing method according to claim 19, wherein the interrupt message of the memory write transaction includes a system specified address and the system specified message.

24. The processing method according to claim 20, wherein the step of calculating the interrupt counting value comprises:

equalizing the read interrupt counting value to the sent interrupt counting value when the read interrupt counting value is smaller than the sent counting value.

* * * * *